(12) United States Patent
Lin

(10) Patent No.: US 7,580,194 B2
(45) Date of Patent: Aug. 25, 2009

(54) PROJECTION LENS WITH HIGH RESOLUTION AND REDUCED OVERALL LENGTH

(75) Inventor: Chun-Ling Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/955,291

(22) Filed: Dec. 12, 2007

(65) Prior Publication Data

US 2009/0059384 A1 Mar. 5, 2009

(30) Foreign Application Priority Data

Aug. 29, 2007 (CN) .................... 2007 1 0201513

(51) Int. Cl.
*G02B 9/00* (2006.01)
(52) U.S. Cl. ..................... 359/649; 359/691
(58) Field of Classification Search ............. 359/691, 359/649, 680–681
See application file for complete search history.

(56) References Cited

U.S. PATENT DOCUMENTS

| | | | |
|---|---|---|---|
| 5,550,679 A * | 8/1996 | Sugawara | ............. 359/689 |
| 5,644,435 A | 7/1997 | Shikama | |
| 6,147,812 A * | 11/2000 | Narimatsu et al. | ............. 359/691 |
| 6,671,104 B2 * | 12/2003 | Endo | ............. 359/691 |
| 7,038,857 B1 * | 5/2006 | Kuo | ............. 359/680 |
| 2006/0092525 A1 * | 5/2006 | Sato et al. | ............. 359/682 |
| 2007/0058267 A1 | 3/2007 | Kawana | |

* cited by examiner

*Primary Examiner*—Scott J Sugarman
*Assistant Examiner*—James R Greece
(74) *Attorney, Agent, or Firm*—D. Austin Bonderer

(57) ABSTRACT

An exemplary projection lens includes, in this order from the screen-side thereof, a negative lens group having negative refraction of power, and a positive lens group having positive refraction of power. The positive and negative lens groups each include a number of positive and negative lenses. The focal length of the projection lens is adjustable. The projection lens satisfies the formulas of: $-2<F1/Fw<-1.6$; $1.2<F2/Fw<1.4$; and $Vg2>56$, where $F1$, and $F2$ respectively represent the effective focal lengths of the negative lens group and the positive lens group, $Fw$ is the shortest effective focal length of the projection lens, and $Vg2$ is the average of the Abbe numbers of the positive lenses in the positive lens group.

4 Claims, 26 Drawing Sheets

PROJECTION LENS WITH HIGH RESOLUTION AND REDUCED OVERALL LENGTH

BACKGROUND

1. Technical Field

The invention relates to projection lenses and, particularly, relates to a projection lens having a high resolution and a small overall length.

2. Description of Related Art

In order to obtain a sharp projection image and reduce a size of projectors, such as digital light processing (DLP) projectors, liquid crystal display (LCD) projectors, or liquid crystal on silicon (LCoS) projectors, projection lenses with high resolution but short overall length (the distance between the screen-side surface of such a projection lens and a surface of a spatial light modulator (SLM), e.g., digital micro-mirror device (DMD), LCD panel, or LCoS panel, equipped in a projector facing the projection lens) are needed. Factors affecting both the resolution and the overall length of the projection lens, such as the number and position of lenses employed, the refraction power distributions of the employed lenses, and the shape of each of the employed lenses, complicate any attempt at increasing resolution and shortening overall length of projection lenses. For example, reducing the number of lenses can shorten the overall length of the projection lens, but resolution will suffer, conversely, increasing the number of lenses can increase resolution, but increases overall length of the projection lens.

Therefore, it is desirable to provide a projection lens which can overcome the abovementioned problems.

SUMMARY

In a present embodiment, a projection lens includes, in this order from the screen-side thereof, a negative lens group having negative refraction of power, and a positive lens group having positive refraction of power. The positive and negative lens groups each include a number of positive and negative lenses. The focal length of the projection lens is adjustable. The projection lens satisfies the formulas of: $-2<F1/Fw<-1.6$; $1.2<F2/Fw<1.4$; and $Vg2>56$, where F1, and F2 respectively represent the effective focal lengths of the negative lens group and the positive lens group, Fw is the shortest effective focal length of the projection lens, and Vg2 is the average of the Abbe numbers of the positive lenses in the positive lens group.

BRIEF DESCRIPTION OF THE DRAWINGS

Many aspects of the present projection lens should be better understood with reference to the following drawings. The components in the drawings are not necessarily drawn to scale, the emphasis instead being placed upon clearly illustrating the principles of the present projection lens. Moreover, in the drawings, like reference numerals designate corresponding parts throughout the several views.

DETAILED DESCRIPTION OF THE EMBODIMENTS

Embodiments of the present projection lens will now be described in detail with reference to the drawings.

Figure 1:
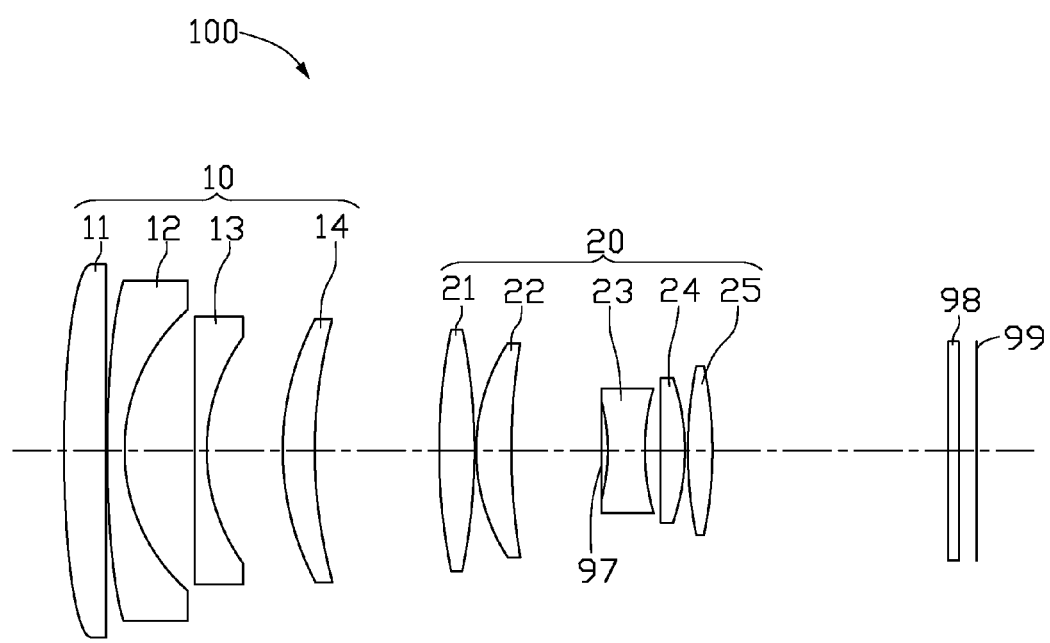
FIG. 1 is a schematic view of a projection lens that is in the wide-angle state, according to a first embodiment.
Figure 2:
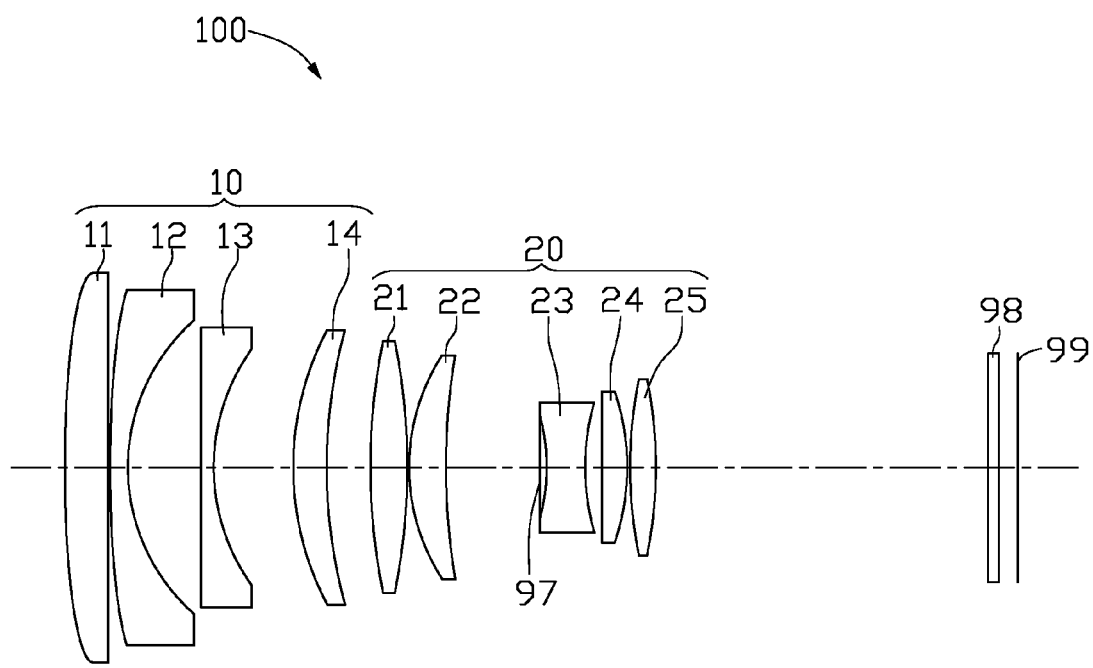
FIG. 2 is a schematic view of a projection lens that is in the telephoto state, according to the first embodiment.

Referring to FIGS. 1, 2, a projection lens 100 in accordance with an exemplary embodiment is opportunely used in DLP projectors. Such a DLP projector is commonly equipped with a DMD (not shown) that has a surface 99 facing the projection lens 100. The projection lens 100 includes, in this order from the screen-side of the projection lens, a negative lens group 10 and a positive lens group 20 each including a number of lenses having positive refraction of power and a number of lenses having negative refraction of power. The lens groups 10, 20 are mounted such that both of them can be slid along the optical axis of the projection lens 100. Thereby, the effective focal length of the projection lens 100 can be changed by adjusting the positions of the lens groups 10, 20. In particular, the effective focal length of the projection lens 100 can be reduced by sliding the lens groups 10, 20 away from each other until the projection lens 100 is in the wide angle state with the shortest effective focal length, as shown in FIG. 1. Conversely, the effective focal length of the projection lens 100 can be increased by sliding the lens groups 10, 20 toward each other until the projection lens 100 is in the telephoto state with the longest effective focal length, as shown in FIG. 2. The projection lens 100 satisfies the formulas of: (1) $-2<F1/Fw<-1.6$; (2) $1.2<F2/Fw<1.4$; and (3) $Vg2>56$, where F1, and F2 respectively represent the effective focal lengths of the negative lens group 10 and the positive lens group 20, Fw is the shortest effective focal lengths of the projection lens 100, and Vg2 is the average of Abbe numbers of the lenses having positive refraction of power in the positive lens group 20.

The formulas (1), (2) are adapted for distributing the refraction power of the lens groups 10, 20, to limit the overall length of the projection lens 100, and control/correct aberrations occurring in the projection lens 100 within an acceptable level. As for formula (1), F1/Fw being $>-2$ limits the overall length of the projection lens 100, and widens the field angle of the projection lens 100; and F1/F being $<-1.6$ controls aberrations, especially distortion, caused by the negative lens group 10. Formula (2) is adapted to efficiently correct aberrations caused by the negative lens group 10, and to obtain a telecentric projection lens 100 with short overall length. Specifically, if $F2/F>1.2$ is not satisfied, aberrations may be insufficiently corrected, and the projection lens 100 may lose the telecentric characteristic, conversely, if F2/F<1.4 is not satisfied, aberrations may be over-corrected, and attempt at shortening the overall length of the projection lens 100 may fail. The formula (3) is configured to control lateral chromatic aberration occurring in the projection lens 100.

Specifically, the negative lens group 10 includes, in this order from the magnification side to the minification side of the projection lens 100, a first lens 11 of positive refraction power, a second lens 12 of negative refraction power, a third lens 13 of negative refraction power, and a fourth lens 14 of positive refraction power.

Specifically, the negative lens group 10 includes, in this order from the screen-side of the projection lens, a first lens 11 of positive refraction power, a second lens 12 of negative refraction power, a third lens 13 of negative refraction power, and a fourth lens 14 of positive refraction power.

More specifically, the projection lens 100 further includes an aperture stop 97. The aperture stop 97 is interposed between the sixth lens 22 and the seventh lens 23 so as to block off-axis light rays from the seventh lens 23 entering the sixth lens 22, and thereby prevents too much distortion occurring in the projection lens 100 (the off-axis light rays are the main cause of distortion).

Opportunely and specifically, the lenses of the projection lens 100 are advantageously spherical glass lenses to reduce cost of the projection lens 100 and control lateral chromatic aberration occurring in the projection lens 100

Detailed examples of the projection lens 100 are given below in company with FIGS. 3-26, but it should be noted that the projection lens 100 is not limited to these examples. Listed below are the symbols used in these detailed examples:

Surface i: the surface of the optics of the projection lens 100 arranged from the screen-side of the projection lens;
$F_{No}$: F number;
2ω: field angle;
R: radius of curvature;
D: distance between surfaces on the optical axis of the projection lens 100;
Nd: refractive index of lens; and
V: Abbe number.

When projecting an image, the image is modulated by the DMD, and projects from the surface 99, transmits through a cover glass 98 that is set for protection of the DMD, the projection lens 100, and finally projects onto a screen (not shown).

EXAMPLE 1

Tables 1, 2 show the lens data of Example 1, wherein F1=−36.8239 mm, and F2=27.7584 mm.

TABLE 1

| Surface i | R (mm) | D (mm) | Nd | V |
|---|---|---|---|---|
| 1 | 80.25 | 3.411 | 1.744 | 1.6457 |
| 2 | 287.724 | 0.17 | — | — |
| 3 | 52.611 | 4.564 | 44.8504 | 55.7884 |
| 4 | 15.069 | 8.849 | — | — |
| 5 | −83.909 | 1.5 | 1.5156 | 1.6444 |
| 6 | 24.987 | 4.564 | — | — |
| 7 | 25.01 | 3.269 | 56.8435 | 55.9987 |
| 8 | 50.419 | D1(see table 2) | — | — |
| 9 | 63.44 | 3.286 | 1.5186 | 1.6204 |
| 10 | −76.309 | 0.17 | — | — |
| 11 | 20.649 | 3.413 | 55.7539 | 60.3236 |
| 12 | 74.946 | 7.751 | — | — |

TABLE 1-continued

| Surface i | R (mm) | D (mm) | Nd | V |
|---|---|---|---|---|
| 13 | infinite | 1.069 | — | — |
| 14 | −23.785 | 2.57 | 1.7552 | 1.6361 |
| 15 | 27.534 | 0.758 | — | — |
| 16 | −270.785 | 3.711 | 27.5795 | 57.3858 |
| 17 | −20.648 | 0.17 | — | — |
| 18 | 31.581 | 2.991 | 1.6672 | 1.5069 |
| 19 | −50.572 | D2(see table 2) | — | — |
| 20 | infinite | 1.05 | 52.6547 | 63.128269 |
| 21 | infinite | 1.85 | — | — |
| 22 | infinite | — | — | — |

TABLE 2

| Lens state | F(mm) | $F_{No}$ | 2ω | D1(mm) | D2(mm) |
|---|---|---|---|---|---|
| Wide-angle state | 20.03 | 2.6 | 58.64° | 12.30828 | 22.65 |
| Telephoto state | 23.99 | 2.62 | 49.86° | 3.872033 | 25.67089 |

Figure 3:
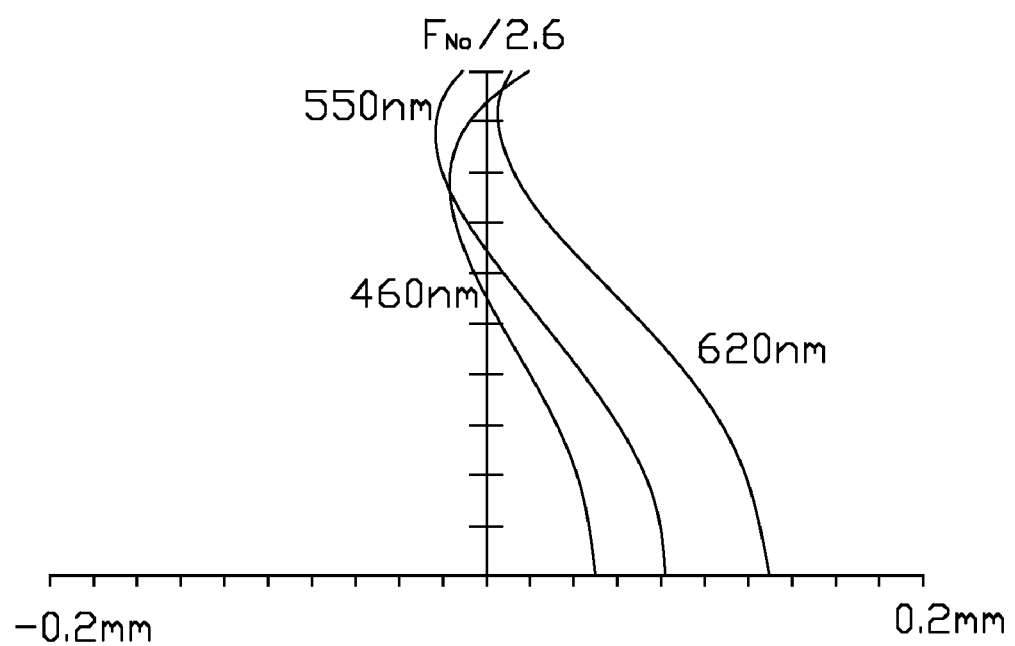
FIGS. 3-6 are graphs respectively showing spherical aberration, field curvature, distortion, and lateral chromatic aberration occurring in the projection lens in the wide-angle state as in FIG. 1, according to a second embodiment.
Figure 4:
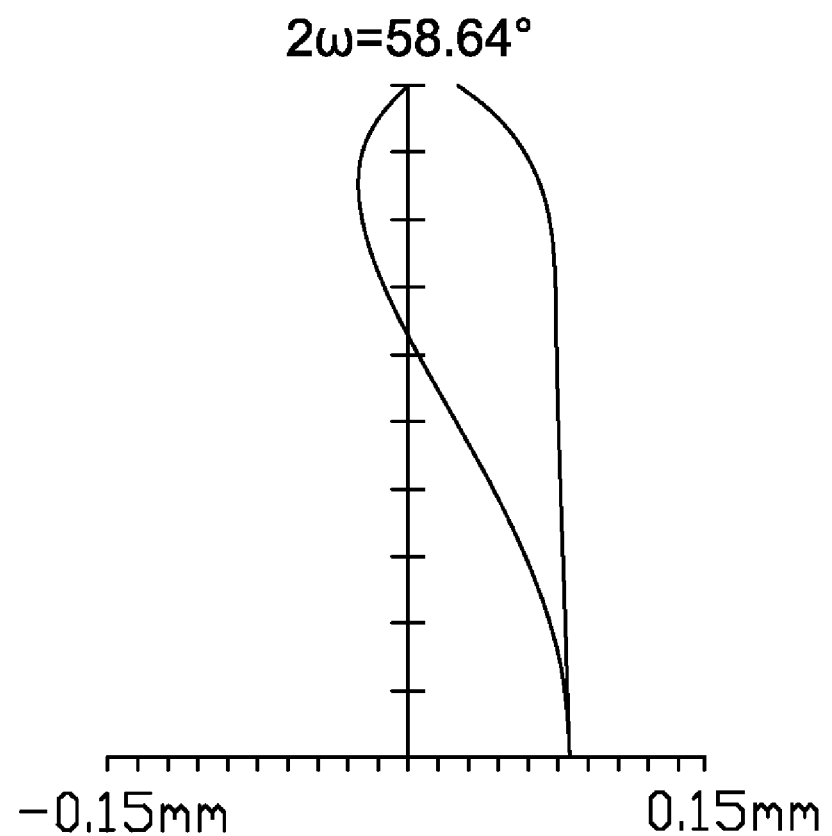
Figure 5:
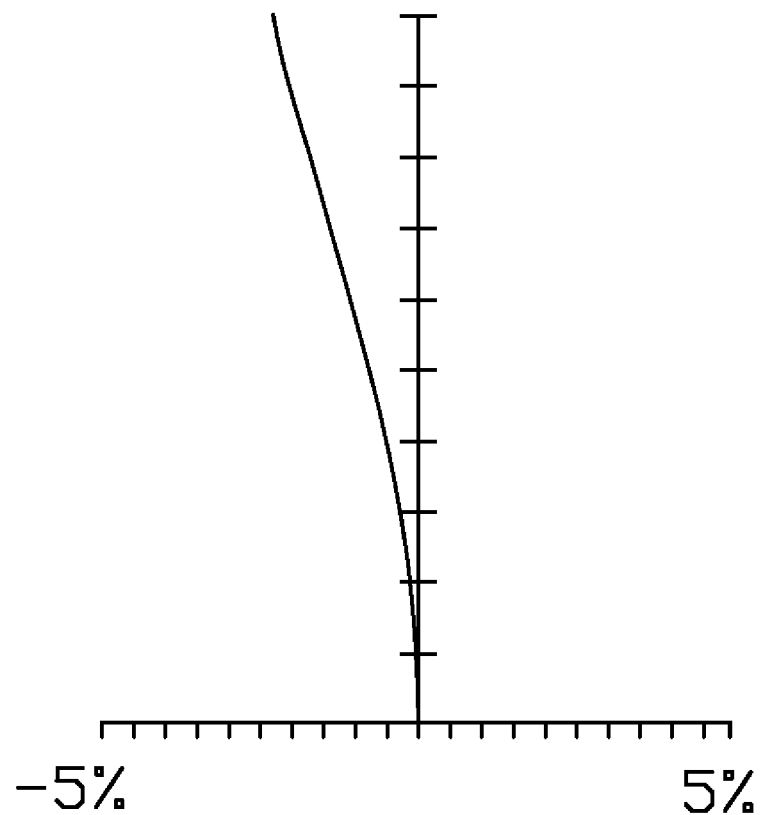
Figure 6:
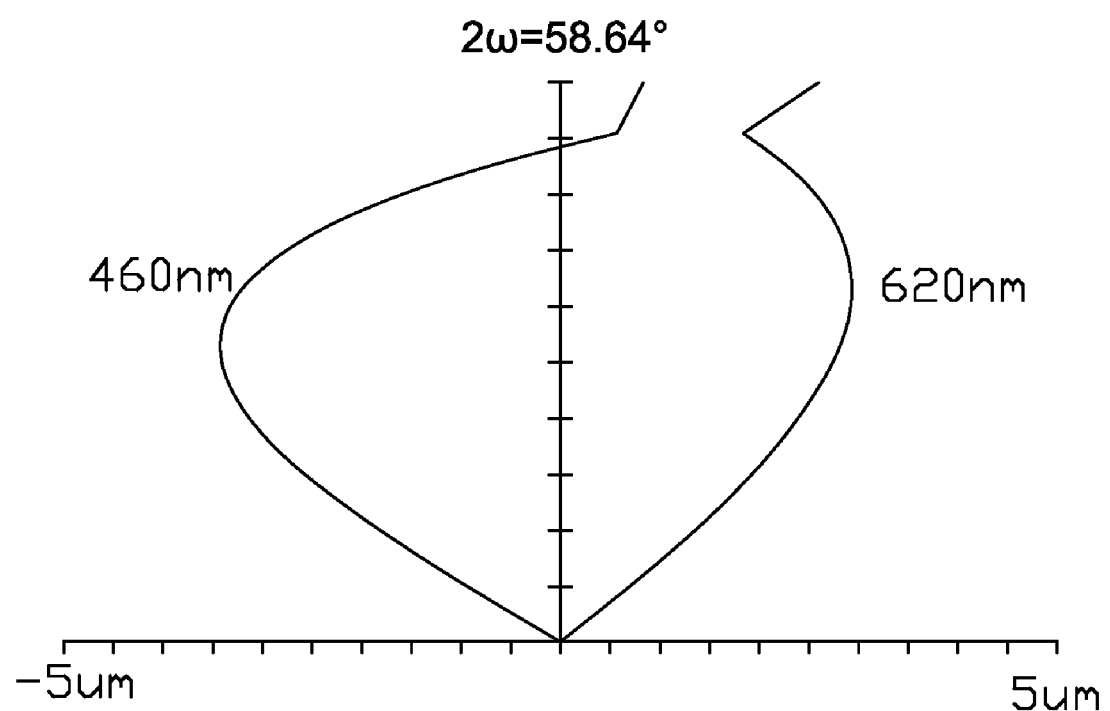
Figure 7:
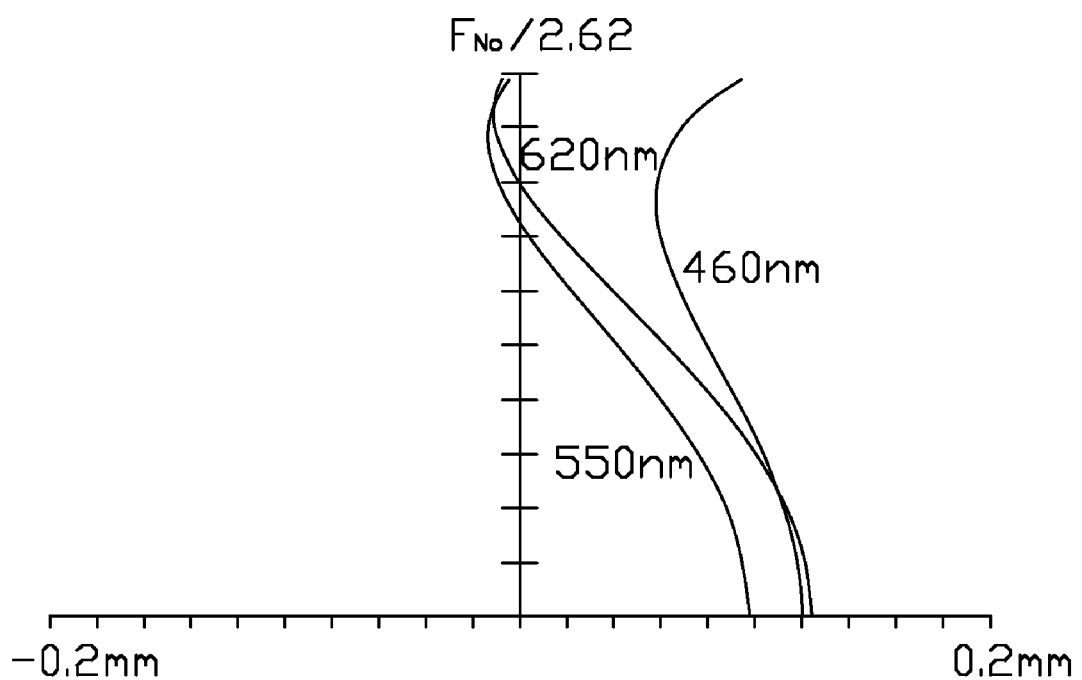
FIGS. 7-10 are graphs respectively showing spherical aberration, field curvature, distortion, and lateral chromatic aberration occurring in the projection lens in the telephoto state as in FIG. 2, according to the second embodiment.
Figure 8:
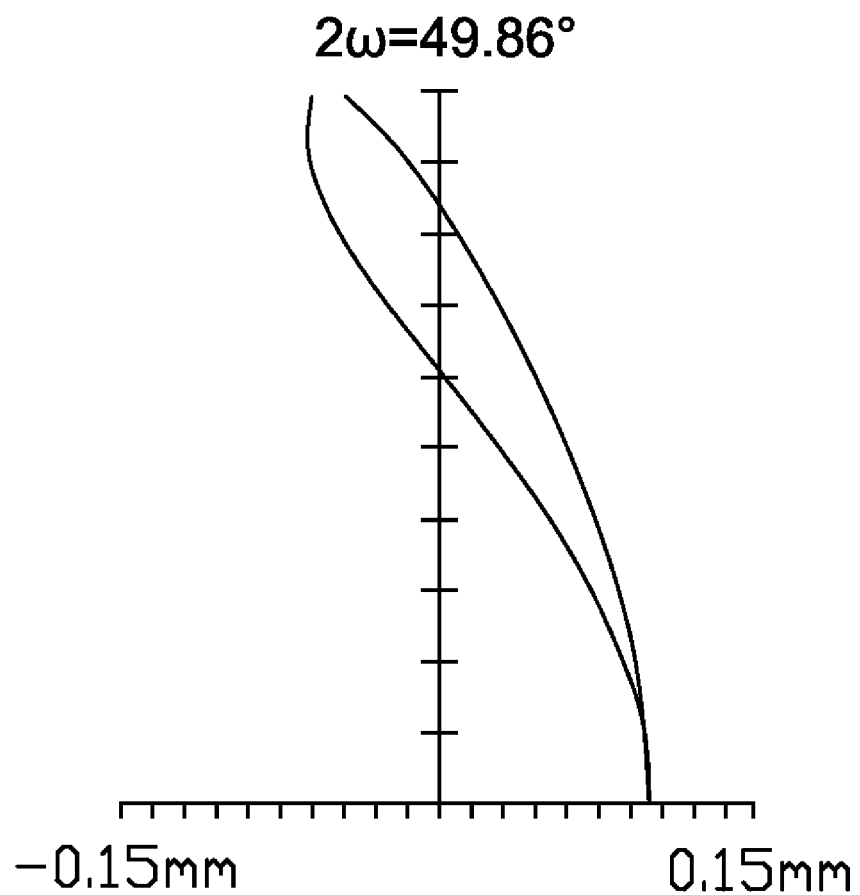
Figure 9:
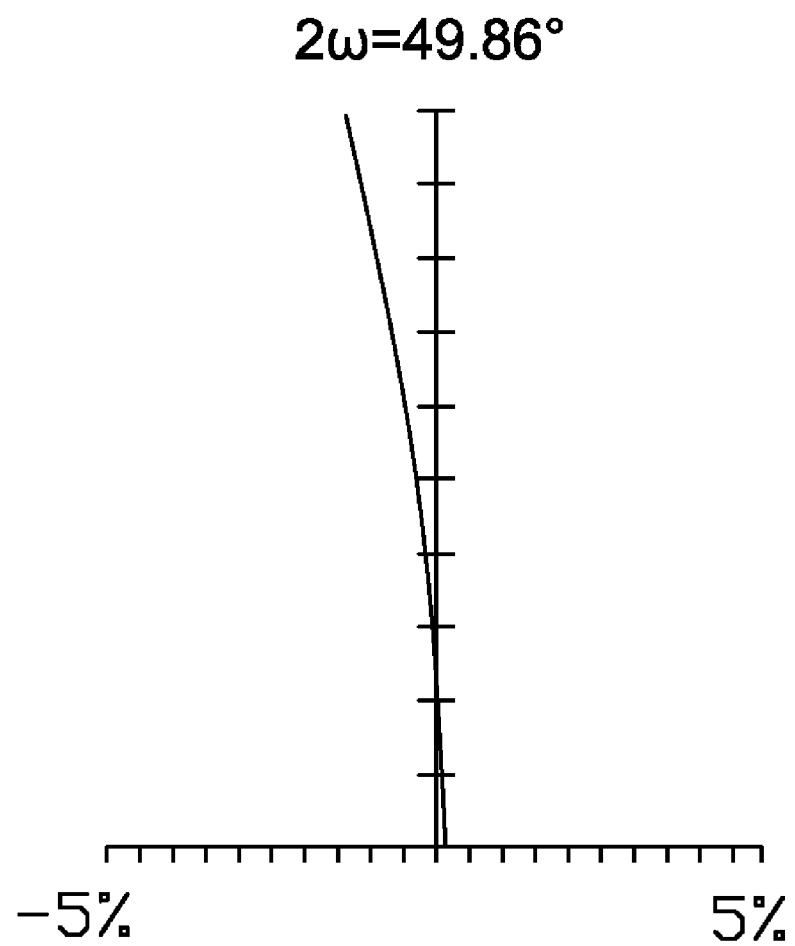
Figure 10:
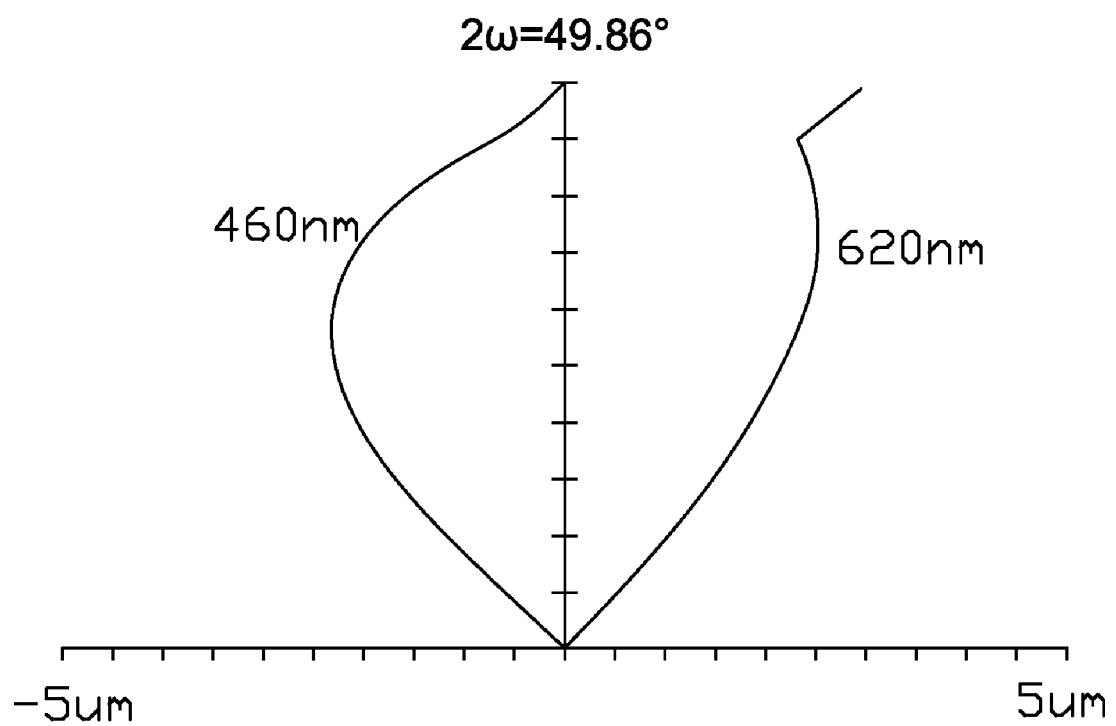
Figure 11:
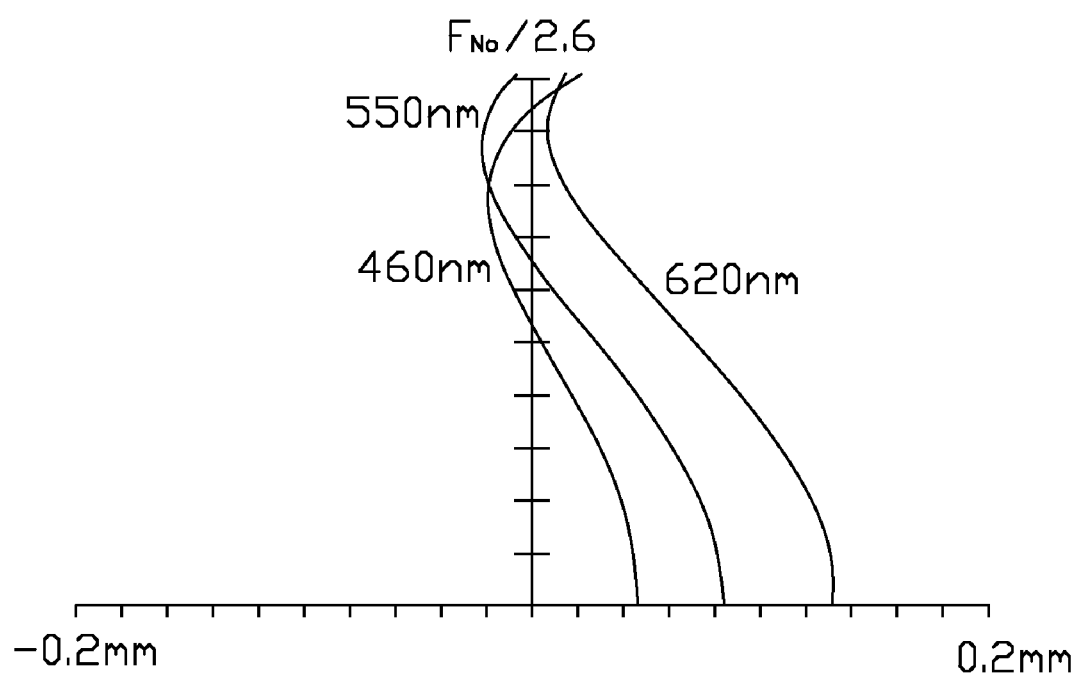
FIGS. 11-14 are graphs respectively showing spherical aberration, field curvature, distortion, and lateral chromatic aberration occurring in the projection lens that is in the wide-angle state as in FIG. 1, according to a third embodiment.
Figure 12:
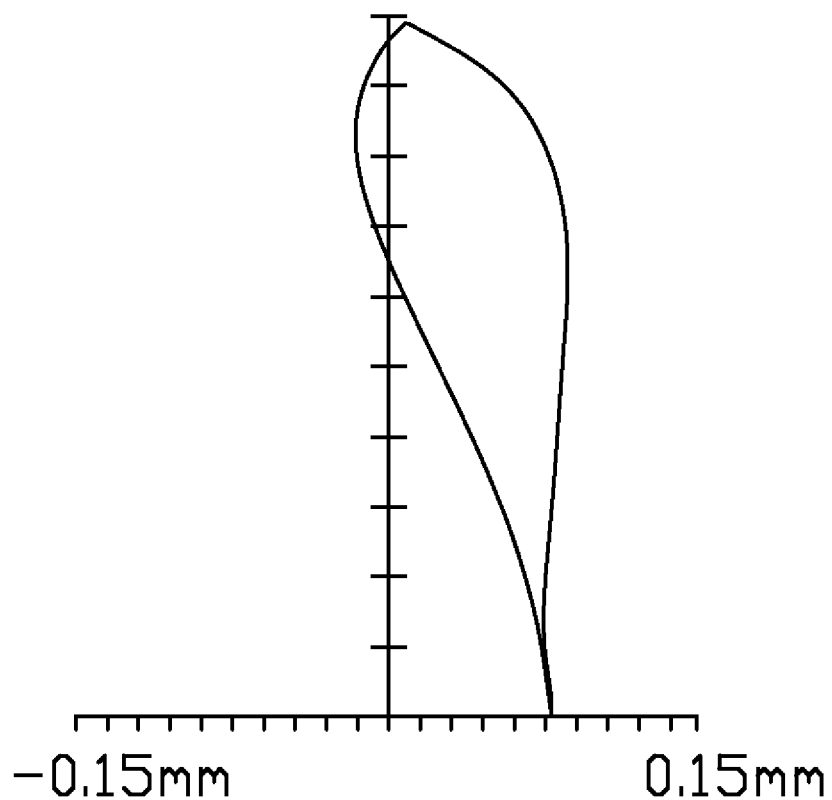
Figure 13:
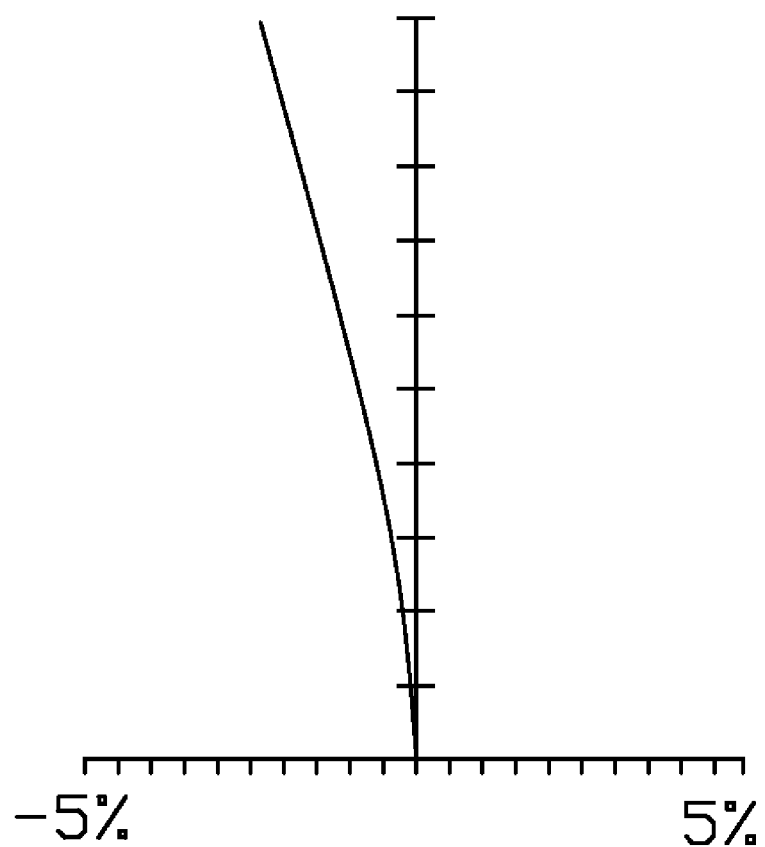
Figure 14:
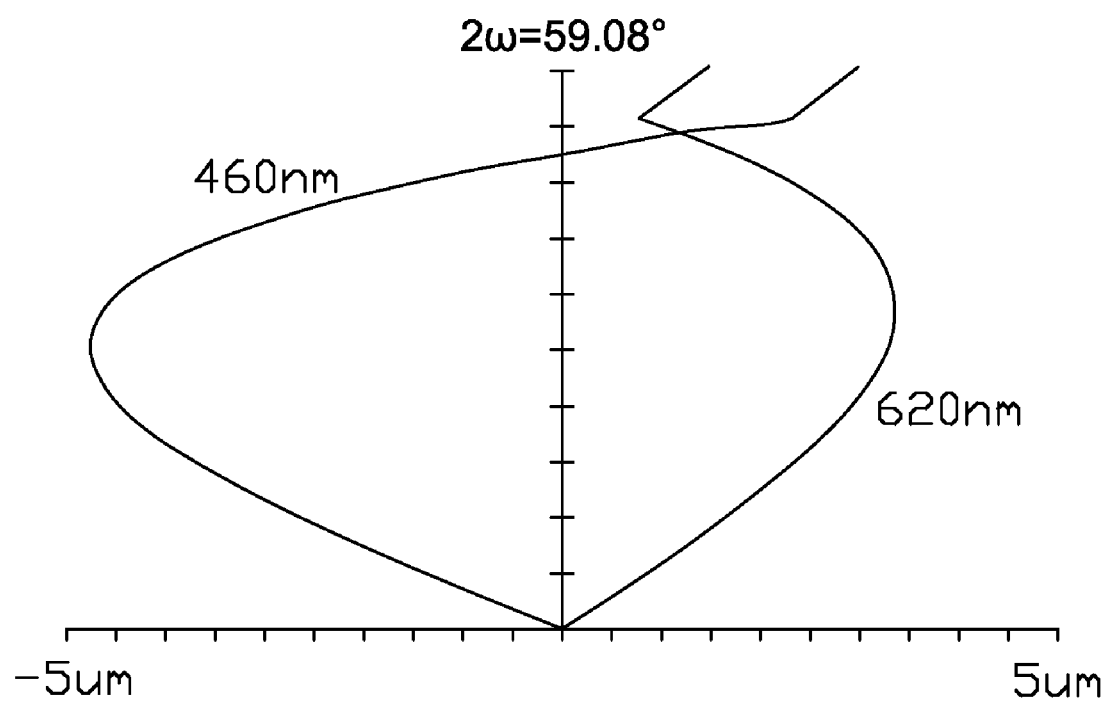
Figure 15:
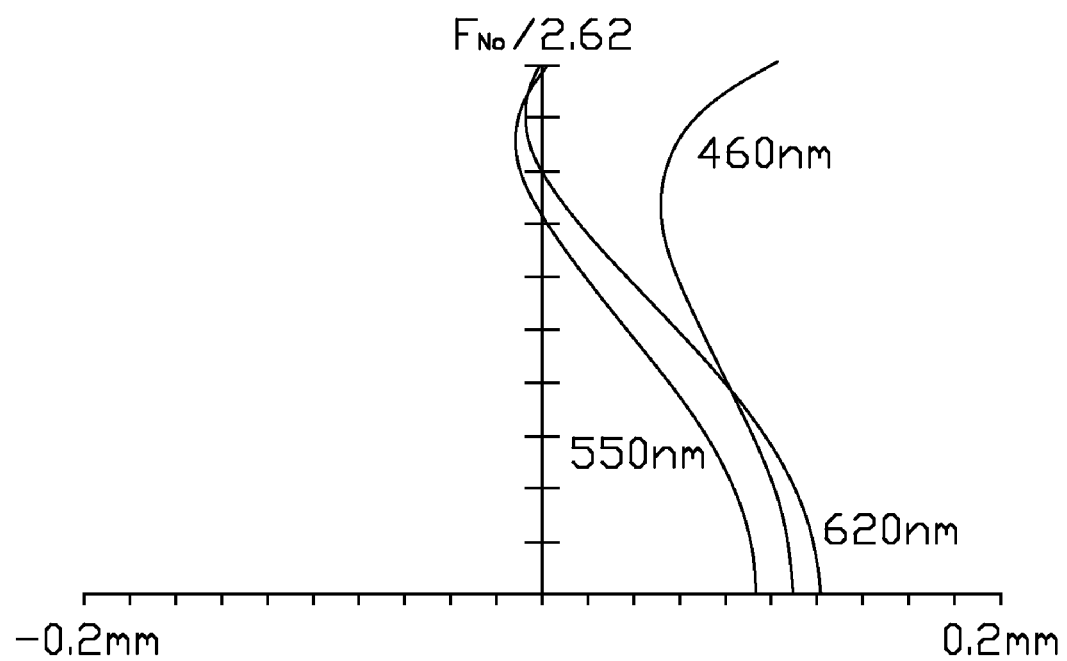
FIGS. 15-18 are graphs respectively showing spherical aberration, field curvature, distortion, and lateral chromatic aberration occurring in the projection lens in the telephoto state as in FIG. 1, according to the third embodiment.
Figure 16:
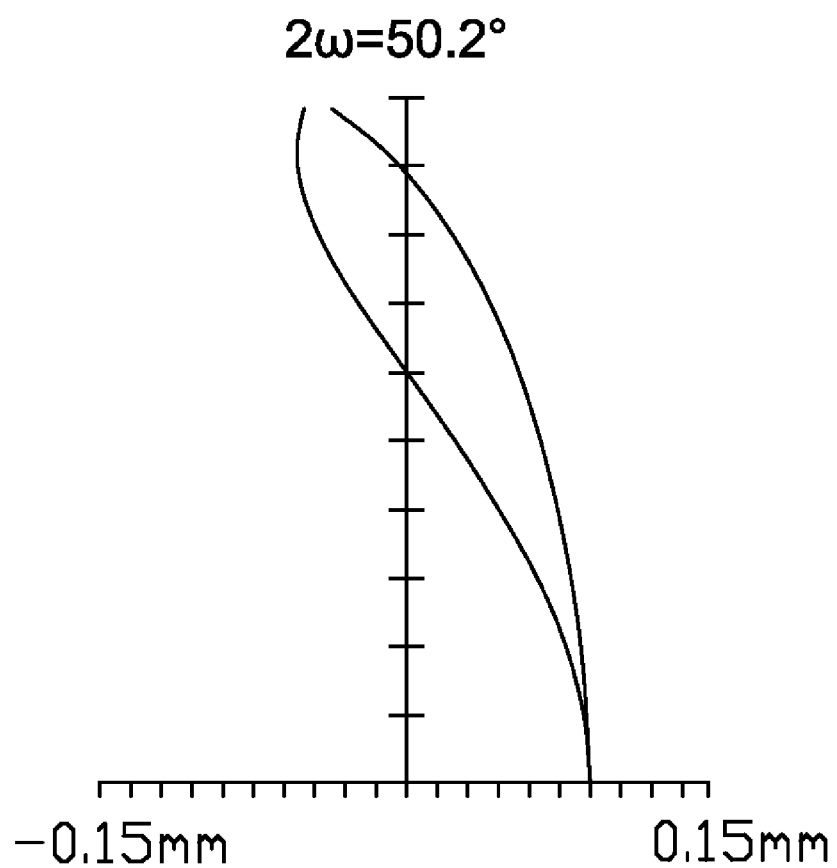
Figure 17:
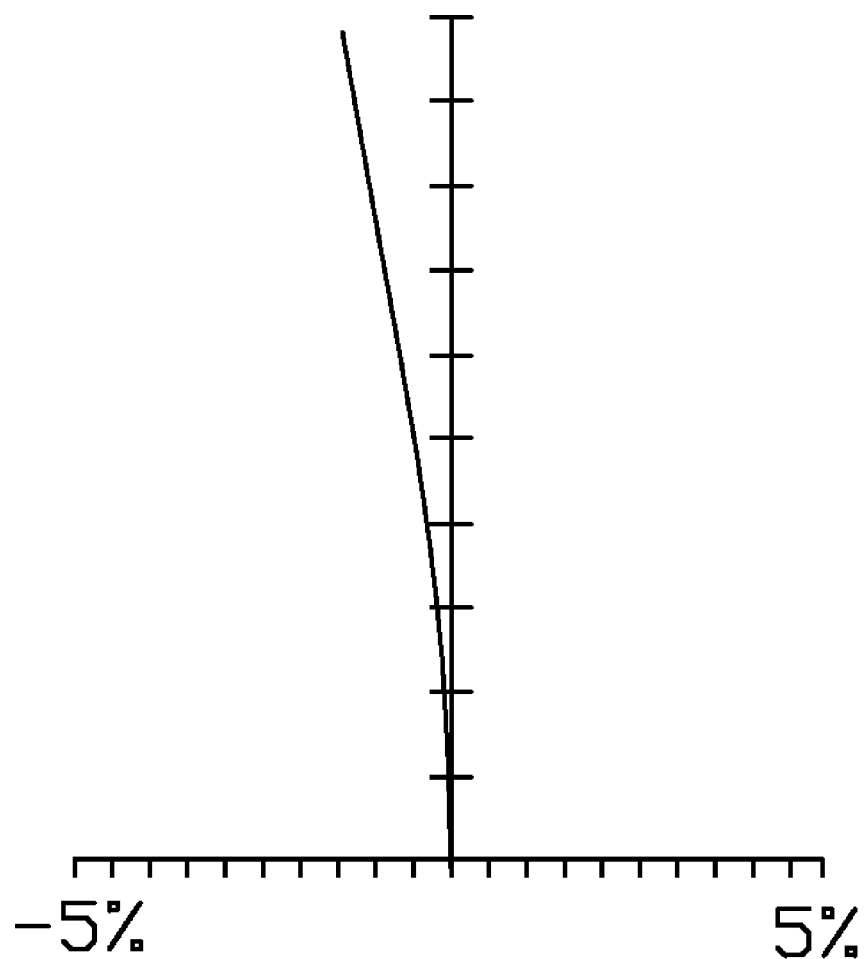
Figure 18:
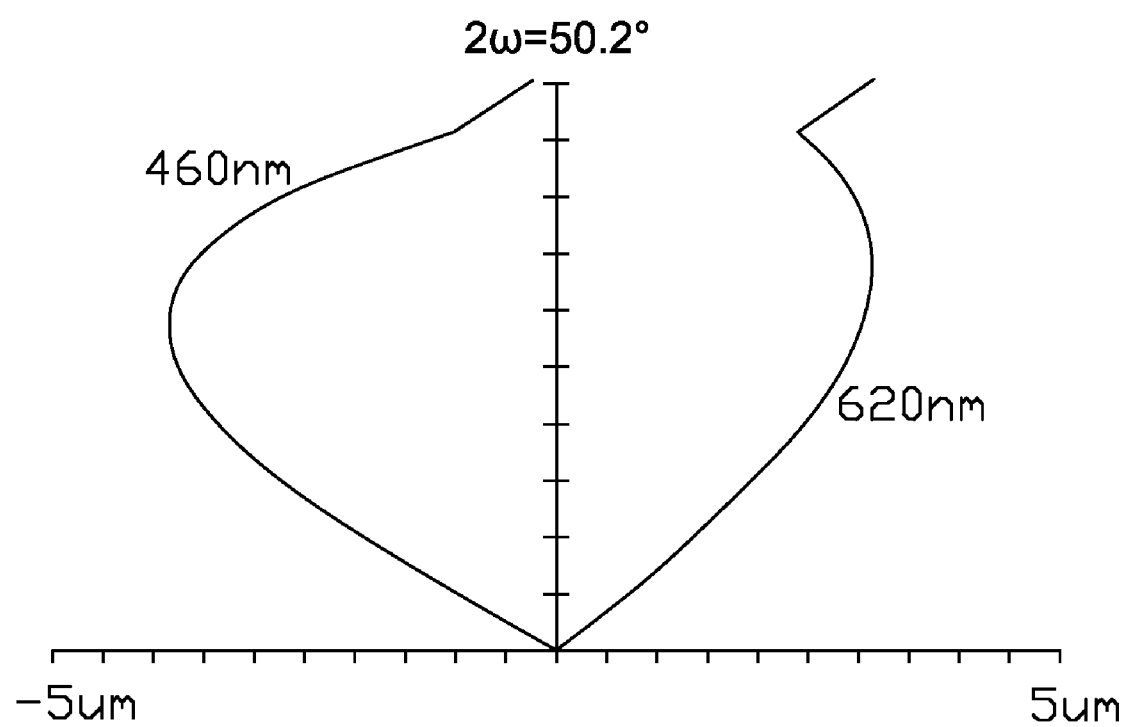
Figure 19:
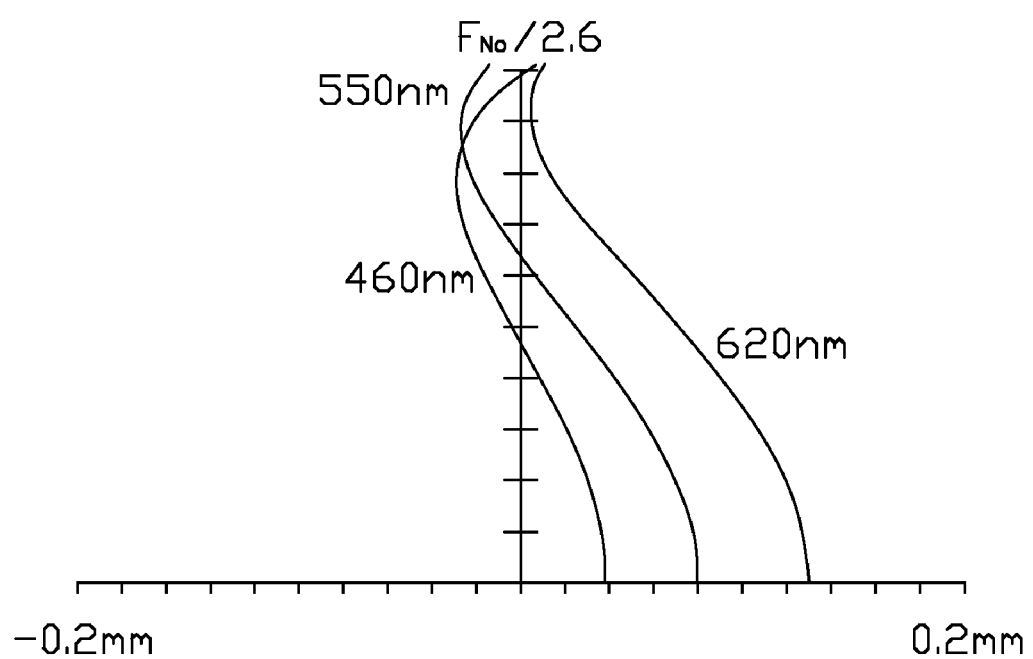
FIGS. 19-22 are graphs respectively showing spherical aberration, field curvature, distortion, and lateral chromatic aberration occurring in the projection lens that is in the wide-angle state as in FIG. 1, according to a fourth embodiment.
Figure 20:
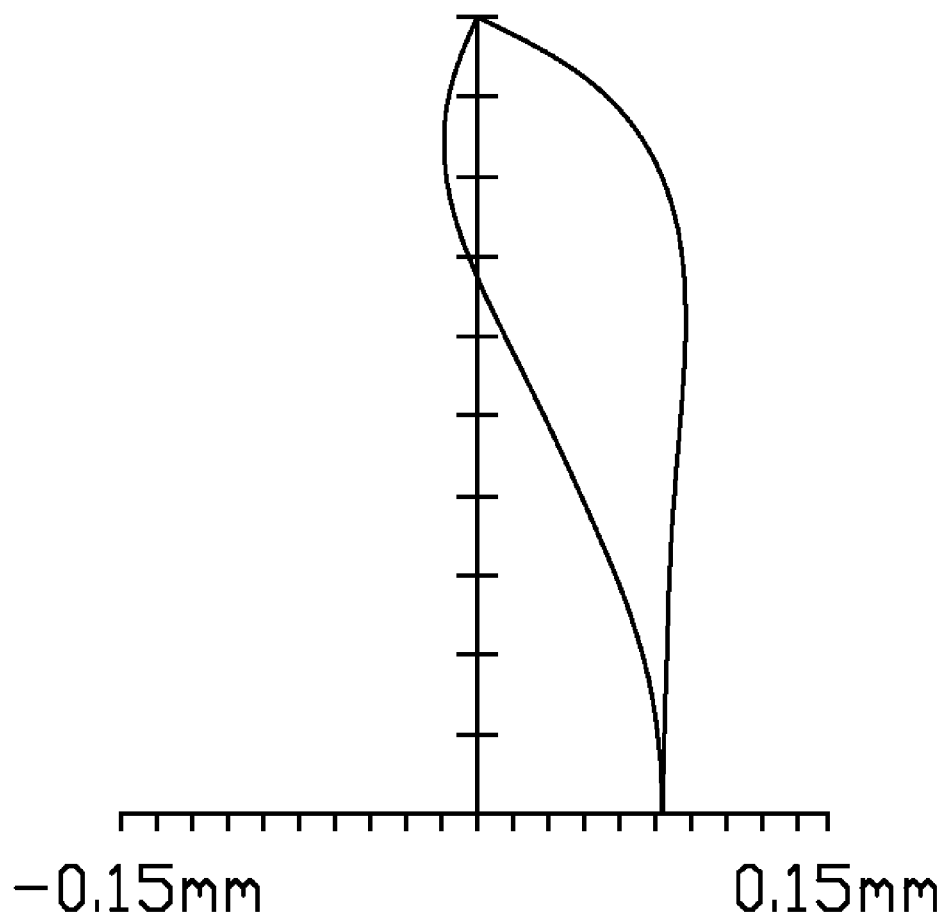
Figure 21:
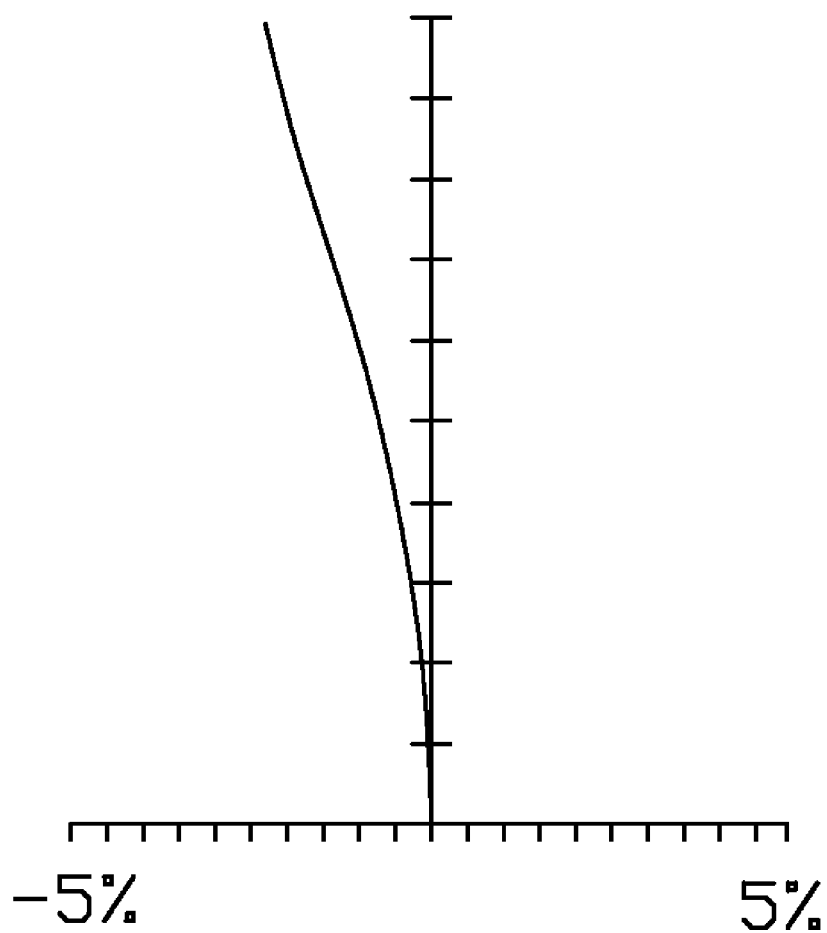
Figure 22:
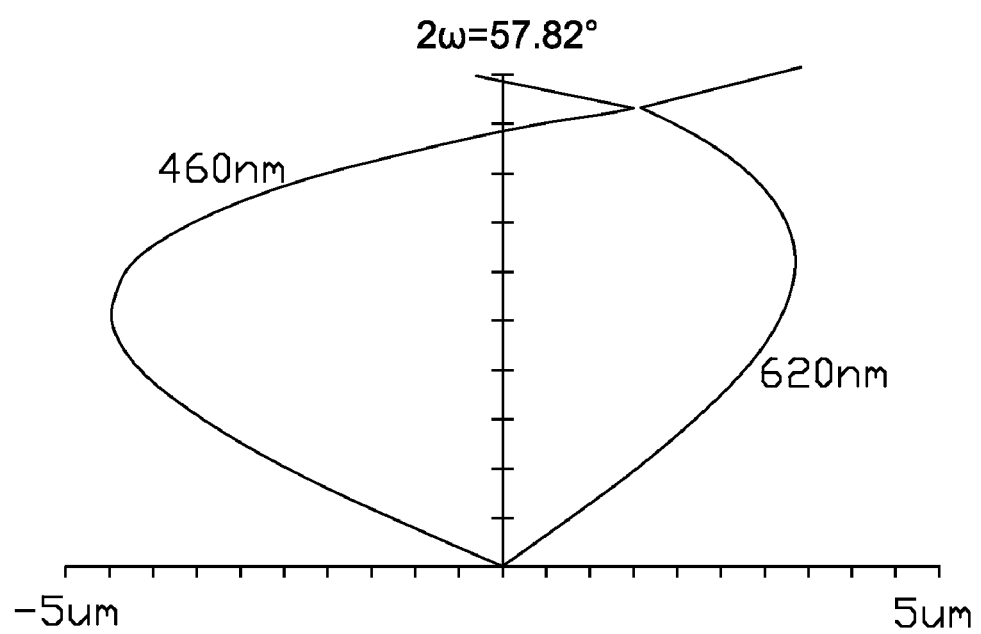
Figure 23:
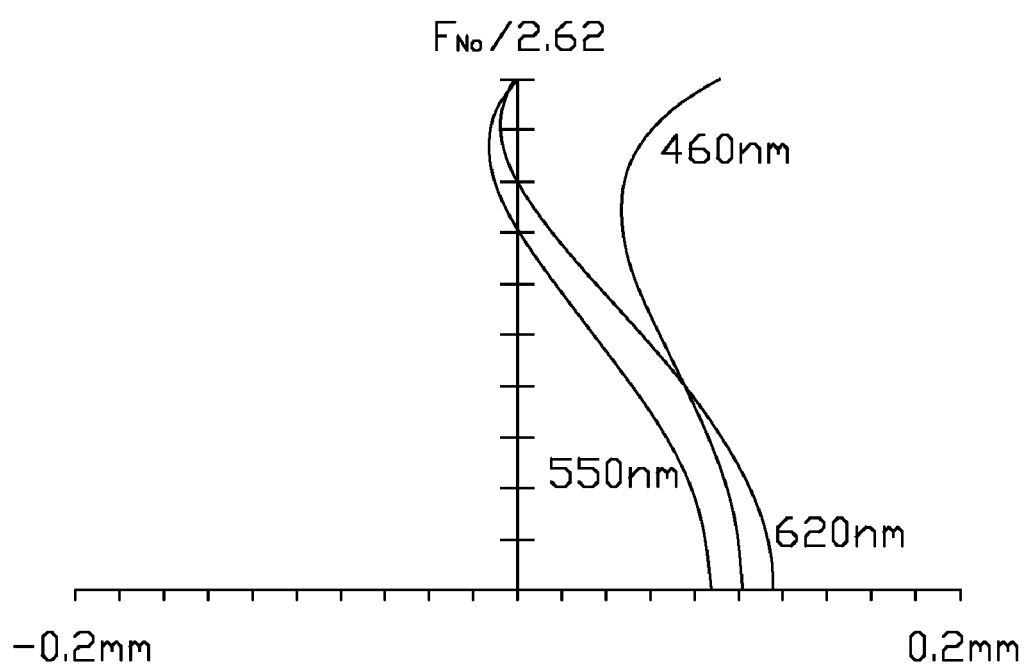
FIGS. 23-26 are graphs respectively showing spherical aberration, field curvature, distortion, and lateral chromatic aberration occurring in the projection lens in the telephoto state as in FIG. 1, according to the fourth embodiment.
Figure 24:
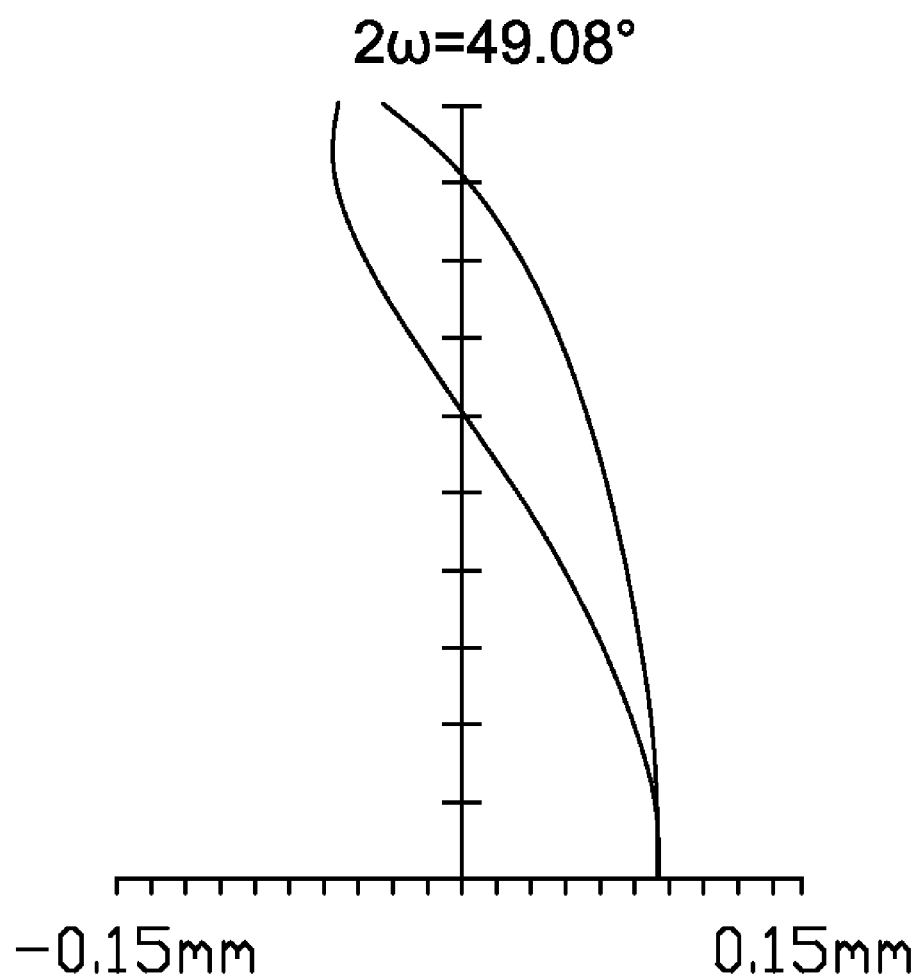
Figure 25:
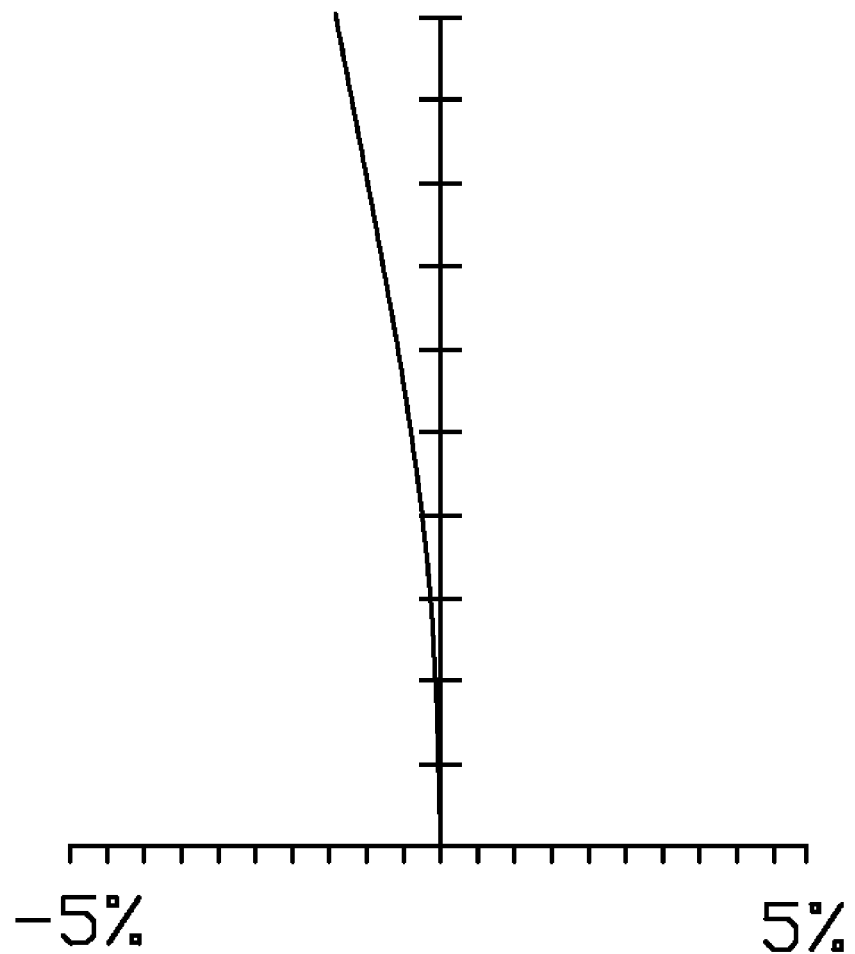
Figure 26:
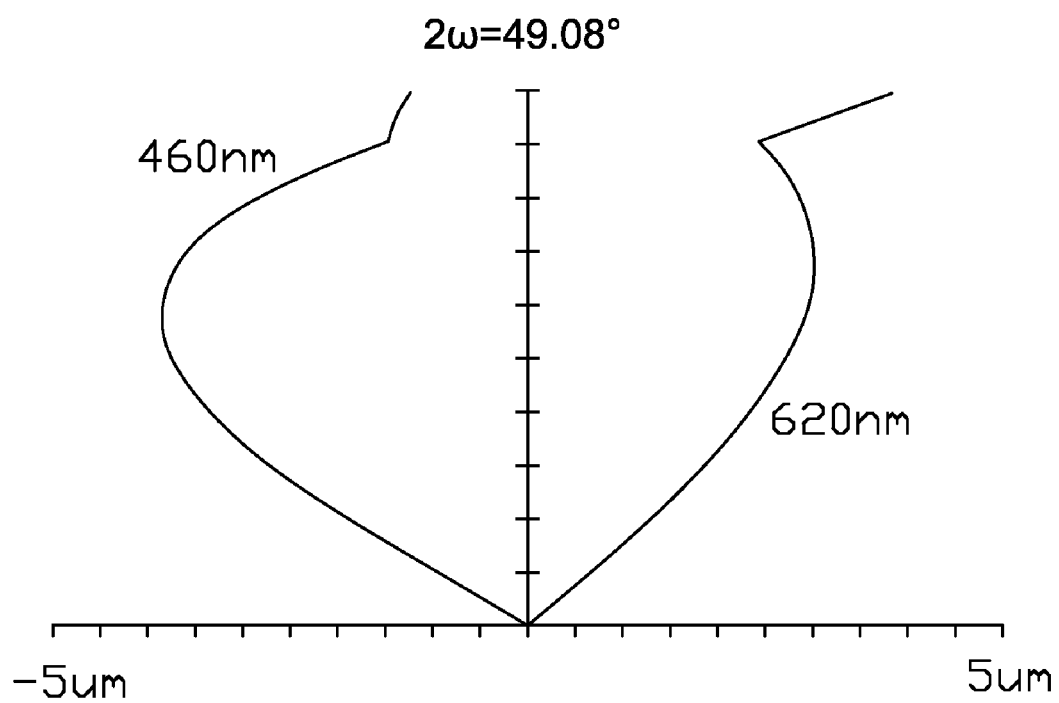

In FIG. 3 (wide-angle state) and FIG. 7 (telephoto state), spherical aberration characteristic curves of 460 nm, 550 nm, and 620 nm light occurring in the projection lens 100 of Example 1 are shown. Obviously, spherical aberration occurring in the projection lens 100 of Example 1 is limited to be in a range of: −0.2 mm~0.2 mm. In FIG. 4 (wide-angle state) and FIG. 8 (telephoto state), the curves t and s are the tangential field curvature curve and the sagittal field curvature curve respectively. Clearly, field curvature occurring in the projection lens 100 of Example 1 is limited to a range of: −0.15 mm~0.15 mm. In FIG. 5 (wide-angle state) and FIG. 9 (telephoto state), distortion occurring in the projection lens 100 of Example 1 is limited to be within the range of: −5%~5%. In FIG. 6 (wide-angle state) and FIG. 10 (telephoto state), characteristic curves of lateral chromatic aberration of 460 nm, and 620 nm light occurring in the projection lens 100 of Example 1 are shown. Obviously, lateral chromatic aberration occurring in the projection lens 100 of Example 1 is limited to a range of: −0.2 um~0.2 um.

EXAMPLE 2

Tables 3, 4 show the lens data of Example 2, wherein F1=−34.9895 mm, and F2=26.2553 mm.

TABLE 3

| Surface i | R (mm) | D (mm) | Nd | V |
|---|---|---|---|---|
| 1 | 59.616 | 3.729 | 1.7443 | 65.9149 |
| 2 | 193.967 | 0.15 | — | — |
| 3 | 50.663 | 1.5 | 44.1361 | 1.5255 |
| 4 | 15.025 | 8.959 | — | — |
| 5 | −95.706 | 1.5 | 1.5341 | 53.4969 |
| 6 | 25.238 | 5.165 | — | — |
| 7 | 24.634 | 3.171 | 1.6204 | 60.3236 |
| 8 | 46.23 | D3(see table 4) | — | — |
| 9 | 60.737 | 3.378 | 1.6204 | 1.6204 |
| 10 | −70.331 | 0.15 | — | — |
| 11 | 20.058 | 3.373 | 60.3236 | 60.3236 |
| 12 | 68.583 | 7.618 | — | — |
| 13 | infinite | 1.043 | — | — |
| 14 | −23.911 | 2.13 | 1.7552 | 1.6332 |
| 15 | 26.524 | 0.731 | — | — |
| 16 | −241.965 | 4.271 | 27.5795 | 57.8925 |
| 17 | −20.977 | 0.15 | — | — |
| 18 | 32.984 | 2.915 | 1.6814 | 1.5069 |

TABLE 3-continued

| Surface i | R (mm) | D (mm) | Nd | V |
|---|---|---|---|---|
| 19 | −49.181 | D4(see table 4) | — | — |
| 20 | infinite | 1.05 | 50.8697 | 63.128269 |
| 21 | infinite | 1.85 | — | — |
| 22 | infinite | — | — | — |

TABLE 4

| Lens state | F(mm) | $F_{No}$ | 2ω | D1(mm) | D2(mm) |
|---|---|---|---|---|---|
| Wide-angle state | 19.85 | 2.6 | 59.08° | 11.5163 | 22.65 |
| Telephoto state | 23.78 | 2.62 | 50.02° | 3.8665 | 25.6352 |

As illustrated in FIGS. 11~18, Spherical aberration occurring in the projection lens 100 of Example 2 is limited to be in a range of: −0.2 mm~0.2 mm, field curvature occurring in the projection lens 100 of Example 2 is limited to a range of: −0.15 mm~0.15 mm, distortion occurring in the projection lens 100 of Example 2 is limited to be within the range of: −5%~5%, lateral chromatic aberration occurring in the projection lens 100 of Example 2 is limited to a range of: −0.2 um~0.2 um.

EXAMPLE 3

Tables 5, 6 show the lens data of Example 3, wherein F1=−35.337 mm, and F2=26.1405 mm.

TABLE 5

| Surface i | R (mm) | D (mm) | Nd | V |
|---|---|---|---|---|
| 1 | 80.25 | 3.411 | 1.7440 | 1.6457 |
| 2 | 287.724 | 0.17 | — | — |
| 3 | 52.611 | 4.564 | 44.8504 | 55.7884 |
| 4 | 15.069 | 8.849 | — | — |
| 5 | −83.909 | 1.5 | 1.5156 | 1.6444 |
| 6 | 24.937 | 4.564 | — | — |
| 7 | 25.01 | 3.269 | 56.8435 | 55.9987 |
| 8 | 50.419 | D5(see table 6) | — | — |
| 9 | 63.44 | 3.286 | 1.5186 | 1.6204 |
| 10 | −76.309 | 0.17 | — | — |
| 11 | 20.649 | 3.413 | 55.7539 | 60.3236 |
| 12 | 74.946 | 7.751 | — | — |
| 13 | infinte | 1.069 | — | — |
| 14 | −23.785 | 2.57 | 1.7552 | 1.6361 |
| 15 | 27.534 | 0.758 | — | — |
| 16 | −270.785 | 3.711 | 27.5795 | 57.3858 |
| 17 | −20.648 | 0.17 | — | — |
| 18 | 31.581 | 2.991 | 1.6672 | 1.5069 |
| 19 | −50.572 | D6(see table 6) | — | — |
| 20 | infinte | 1.05 | 52.6547 | 63.128269 |
| 21 | infinte | 1.85 | — | — |
| 22 | infinte | — | — | — |

TABLE 6

| Lens state | F(mm) | $F_{No}$ | 2ω | D1(mm) | D2(mm) |
|---|---|---|---|---|---|
| Wide-angle state | 20.36 | 2.6 | 57.82° | 11.21369 | 22.67 |
| Telephoto state | 24.39 | 2.62 | 49.08° | 3.715894 | 25.6951 |

As illustrated in FIGS. 19~26, Spherical aberration occurring in the projection lens 100 of Example 2 is limited to be in a range of: −0.2 mm~0.2 mm, field curvature occurring in the projection lens 100 of Example 2 is limited to a range of: −0.15 mm~0.15 mm, distortion occurring in the projection lens 100 of Example 2 is limited to be within the range of: −5%~5%, lateral chromatic aberration occurring in the projection lens 100 of Example 2 is limited to a range of: −0.2 um~0.2 um.

In all, in Examples 1~3, though the overall length of the projection lens 100 is reduced, the resolution of the projection lens 100 is maintained, even improved, since aberrations occurring in the projection lens 100 are controlled to be in an acceptable range.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A projection lens with a variable effective focal length comprising, in this order from the screen-side thereof,
    a negative lens group having negative refraction of power, comprising, in this order form the screen-side of the projection lens,
        a first lens having positive refraction of power,
        a second lens having negative refraction of power,
        a third lens having negative refraction of power, and
        a fourth lens having positive refraction of power; and
    a positive lens group having positive refraction of power, the positive lens group comprising, in this order from the screen-side of the projection lens,
        a first lens having positive refraction of power,
        a second lens having positive refraction of power,
        a third lens having negative refraction of power,
        a fourth lens having positive refraction of power, and
        a fifth lens having positive refraction of power,
        wherein the projection lens satisfies the formulas of: −2<F1/Fw<−1.6; 1.2<F2/Fw<1.4; and Vg2>56, where F1, and F2 respectively represent the effective focal lengths of the negative lens group and the positive lens group, Fw is the shortest effective focal lengths of the projection lens, and Vg2 is the average of the Abbe numbers of the lenses having positive refraction of power in the positive lens group.

2. The projection lens as claimed in claim 1, wherein the negative lens group is movable along the optical axis of the projection lens.

3. The projection lens as claimed in claim 1, wherein the positive lens group is movable along the optical axis of the projection lens.

4. The projection lens as claimed in claim 1, further comprising an aperture stop interposed between the second and third lens.

* * * * *